W. R. COMINGS & E. J. HALL.
APPARATUS FOR MAKING AND SECURING BOX LIDS AND BOTTOMS.
APPLICATION FILED NOV. 5, 1914.

1,221,835.

Patented Apr. 10, 1917.

W. R. COMINGS & E. J. HALL.
APPARATUS FOR MAKING AND SECURING BOX LIDS AND BOTTOMS.
APPLICATION FILED NOV. 5, 1914.

1,221,835.

Patented Apr. 10, 1917.
7 SHEETS—SHEET 6.

W. R. COMINGS & E. J. HALL.
APPARATUS FOR MAKING AND SECURING BOX LIDS AND BOTTOMS.
APPLICATION FILED NOV. 5, 1914.

1,221,835.

Patented Apr. 10, 1917.
7 SHEETS—SHEET 7.

UNITED STATES PATENT OFFICE.

WILLIAM RIGHTER COMINGS, OF WHARNCLIFFE, WIMBLEDON PARK, AND EDWARD JOHN HALL, OF CATFORD, ENGLAND.

APPARATUS FOR MAKING AND SECURING BOX LIDS AND BOTTOMS.

1,221,835.   Specification of Letters Patent.   Patented Apr. 10, 1917.

Application filed November 5, 1914. Serial No. 870,501.

*To all whom it may concern:*

Be it known that we, WILLIAM RIGHTER COMINGS, of Wharncliffe, Wimbledon Park, Surrey, England, engineer, and EDWARD JOHN HALL, of 15 Lutwyche Road, Catford, Kent, England, engineer, the former a citizen of the United States, the latter a citizen of England, have invented certain new and useful Improvements in and Connected with Apparatus for Making and Securing Box Lids and Bottoms, of which the following is a specification.

This invention relates to apparatus for applying the lids or bottoms (hereinafter called lids) to box bodies or canisters and securing such lids thereto.

It has heretofore been proposed in paper or like flexible material to apply and secure the lid to the box body by rolling over the end of the latter and causing same to engage with the dished lid and practically welding the two parts together, and this end has heretofore been secured by the use of a series of hand machines involving separate handling and comparatively slow production.

The present invention relates to an automatic machine by means of which the dished lid, separately made, or made in the machine from a continuous strip, is placed in, or over a box body and the two compressed and welded together by a series of operations, the machine being adapted to operate on a series of box bodies fed thereto.

In order that the invention may be clearly understood, assume that it is desired to make a lid such as illustrated in figures of Comings's British specification No. 6541 of 1908, as from such description the application of the invention for applying and securing other shaped box lids or for treating other flexible material than paper will be readily understood.

To secure the above ends it is proposed to employ in connection with the machine a series of mandrels which may be solid or have solid heads carried on recessed spindles or said mandrels may be of an expanding type. Such mandrels are carried on base pieces adapted to contact one with the other and travel in a circular or oval raceway around and on the bedplate of the machine.

If expanding mandrels are employed then means must be provided for both expanding and contracting the mandrels at suitable parts of their travel. Over such mandrels at different periods of their travel the machine is provided with suitable plungers and dies adapted to act in substantially the following manner:—

The box body being dropped over the mandrel, and assuming the latter to be an expanding mandrel the first action is to expand such mandrel, which may be done by a small plunger striking the wedge in the center of the mandrel, the head of which would be slightly below the top of the box body, that is the part of the body to be turned in extends above the top of the mandrel. The mandrel being then fed forward comes under the lid producing die plunger (hereafter referred to as a sub-press), the lid being cut or cut and stamped from a continuous strip (unless separately made) is dished and forced down by the plunger into the box body, the plunger retiring, the mandrel is then fed beneath the next die which rolls the box body over the up-turned edge of the lid, the upturned edge of the lid being thus inserted in and held to the rolled over portion of the box body, the mandrel being again fed forward. The next operation is that a series of expanding and contracting dies come into action together with a suitable plunger adapted to apply pressure and mold the box body and the lid into the desired locked position, the pressure of said dies being exerted against the plunger and mandrel. Then if desired the next forward step of the mandrel may bring the completed lid beneath a second-sub-press for a further pressure or under the operation of a labeling machine, or both, and the mandrel being contracted by suitable mechanism the box is removed from the mandrel as a completed article.

It will be evident that to secure the foregoing results great accuracy of movement of the mandrels is required. They may be fed forward by a sprocket or like wheel and a band or other brake may be provided to prevent overthrow, but even this may be insufficient to secure absolute accuracy of feed, but the latter may be obtained by means of a locking bolt which may be a tapered wedge reciprocated between the mandrels as the latter come under the dies, it being understood that the bases of the mandrels are always in contact. The machine is preferably arranged so that one stroke of the press operating the dies produces the finished box.

To enable the invention to be fully understood it will now be described by reference to the accompanying drawings in which:—

Fig. 8 showing the mandrel unexpanded and Fig. 9 expanded.

As shown the machine comprises a frame 1 supporting a raceway 2 in which a series of mandrels 3 for the box bodies are driven intermittently beneath reciprocating dies 4, 5. These dies 4, 5, are carried on a slide 6, working in guides 7 and reciprocated against the action of a spring (not shown) by the cam 8 on a shaft geared to the main shaft 9 of the machine, which latter shaft is power driven through the pulleys 10.

Figure 8:
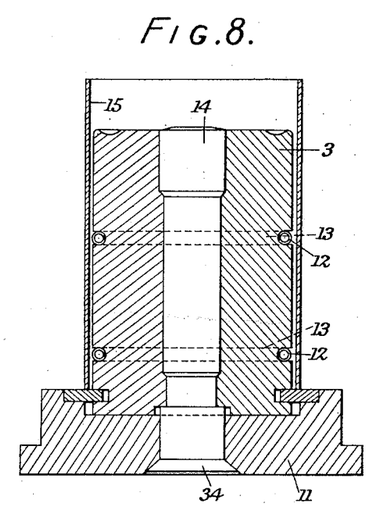
Figs. 8 and 9 are part sectional elevations drawn to a larger scale of the expanding mandrels which are used in the machine.
Figure 9:
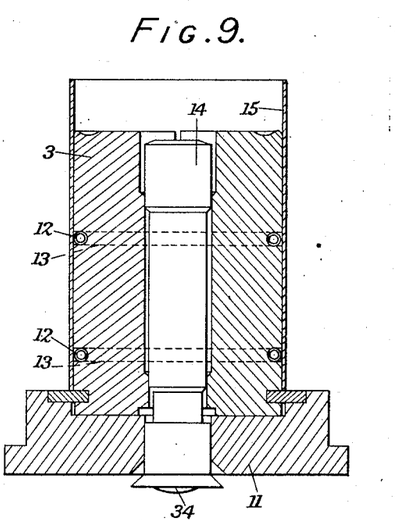

The mandrels employed are preferably of an expanding type and as shown in Figs. 8 and 9 each comprises a split cylinder 3 mounted on a base plate 11 and normally held, by springs 12 in grooves 13, closed upon a central wedge 14 (Fig. 8). The wedge 14 is so shaped that when forced down as in Fig. 9 it causes the split mandrel to expand. A box body 15 is shown slipped over the contracted mandrel in Fig. 8, while in Fig. 9 the mandrel is expanded to hold the box body 15 firmly.

Figure 4:
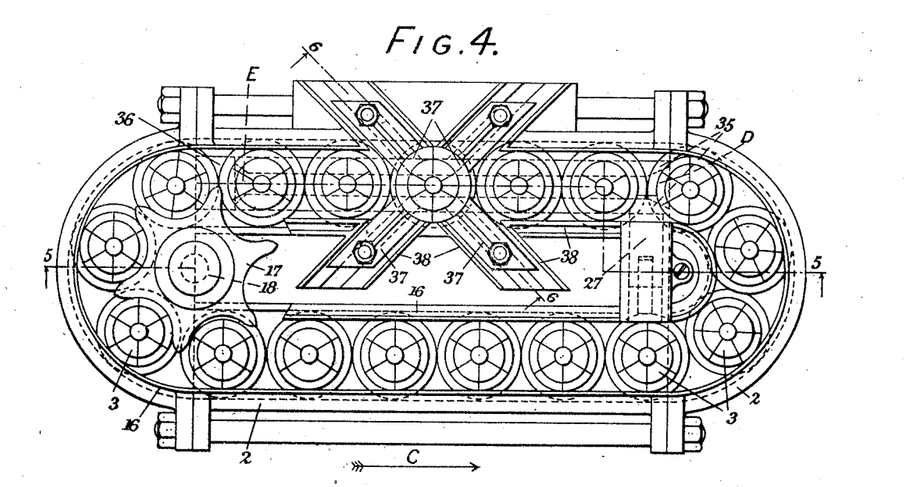
Fig. 4 is a plan view of the raceway and mandrels of the machine.
Figure 5:
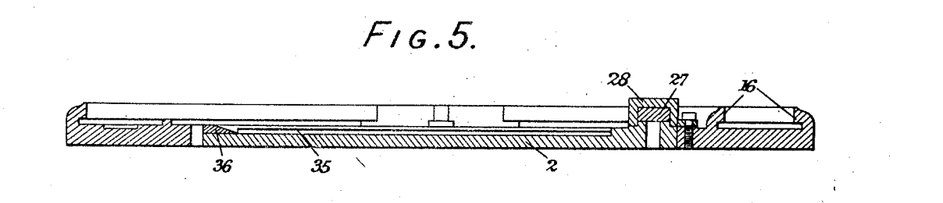
Fig. 5 is a section on the line 5—5 Fig. 4 with the mandrels and certain other portions of the mechanism removed.
Figure 6:
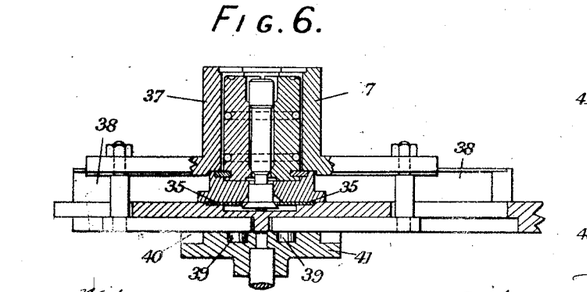
Fig. 6 is a section on the line 6—6 Fig. 4.
Figure 7:
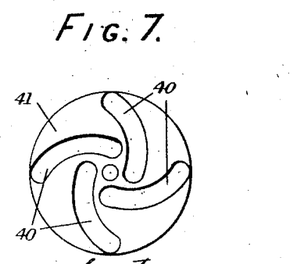
Fig. 7 is a detail of a cam shown in Fig. 6.

Referring to Figs. 4 and 5, a series of mandrels 3 are mounted in the raceway 2 with their bases touching, said bases engaging beneath guides 16. The mandrels are moved along the raceway in the direction of the arrow $c$ by a sprocket wheel 17 on a shaft 18, adapted to engage a mandrel in each tooth space, and driven intermittently, tooth by tooth, by a ratchet wheel 19 and a pawl 20. The pawl is actuated through a link 21 by a rocking lever 22 which is operated by a cam 23 on the shaft 24 geared to the main shaft 9. To prevent overthrow of the mandrels a wheel 25 on the shaft 18 is fitted with a band brake 26. In order to hold the mandrels firmly during the periods of rest when the various dies are operating, a locking bolt 27 slidably mounted in a guide 28 is reciprocated across the raceway at each stroke of the pawl 20 by a connecting rod 29 secured to a pin on the crank disk 30 suitably operated from the main shaft 9. The nose of the bolt 27 projects between the bases of the two mandrels adjacent the dies (Fig. 4) and wedges them firmly.

Figure 3:
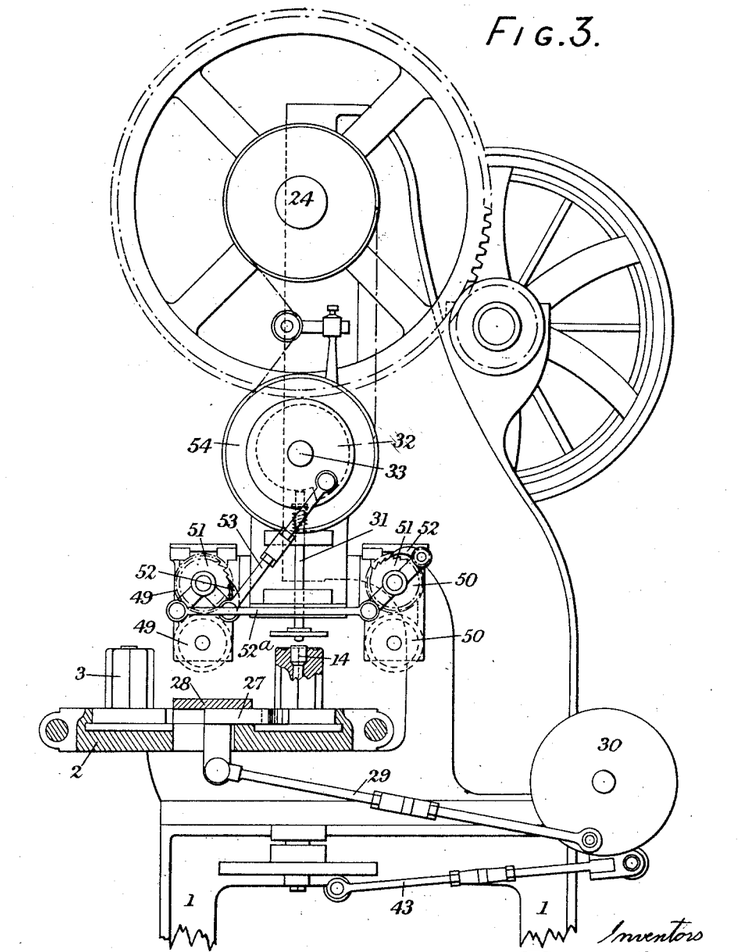
Fig. 3 is an elevation of the left hand side of the machine looking in the direction of the arrow $b$ in Fig. 1.

As the mandrels move along the raceway the box bodies are slipped over them by hand and the first operation of the machine is to expand the mandrels. To this end a spring pressed plunger 31 (Figs. 3, 15, 14) is reciprocated at each stroke of the press by a cam 32 on a shaft 33 driven from the shaft 24 by a belt or chain as shown. This plunger 31 is caused to press the central wedge of each mandrel passing beneath forcing said wedge downward and expanding the mandrel. The lower end of the wedge 14 then projects beneath the base plate 11 (Fig. 9) and this projecting end is provided with a beveled head 34 which at the point D (Fig. 4) engages beneath guide strips 35 which insure that the wedge remains projected during the travel of the mandrel beneath the dies. These guide strips 35 terminate at the point E (Fig. 4). After all the dies have operated on a box body it is necessary to remove the finished article from the mandrel, and for this purpose the mandrel must be contracted. To this end an inclined portion 36 is provided (Fig. 5) transversely on the raceway and in the path of the wedges 14. The projecting ends of the wedges 14 ride up this incline 36 and are forced back into their respective mandrels, contracting same.

Coöperating with the reciprocating dies are four contracting and expanding die members 37 adapted to encircle a box body and mandrel completely as hereinafter more fully described.

These die members 37 move inward and outward in slides 38 under the action of rollers 39 working in grooves 40 in a face cam 41. The cam 41 is carried on a shaft 42 oscillated by a connecting rod 43 attached to a crank 44. The crank 44 is connected to a rod 45 the upper end of which is provided with a slot 46 in which the shaft 24 works, and also a roller 47, the latter engaging with the interior of a hollow cam 48 on the shaft 24.

Figure 1:
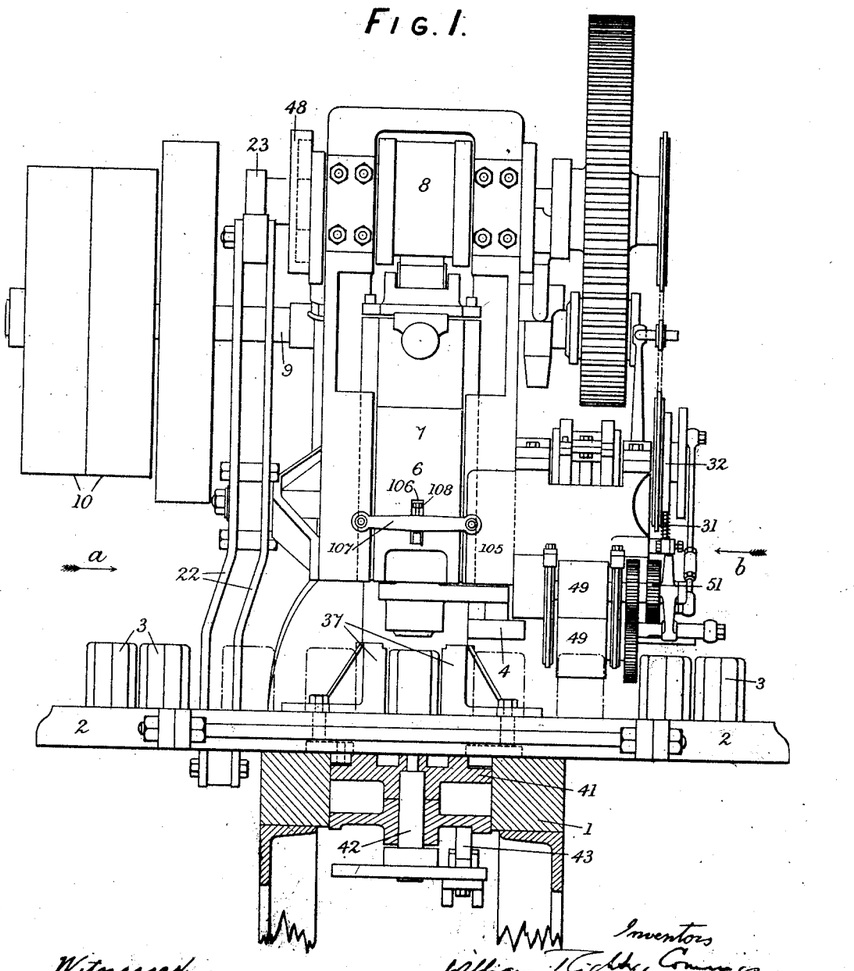
Figure 1 is a front elevation of a machine constructed according to one form of the invention.
Figure 2:
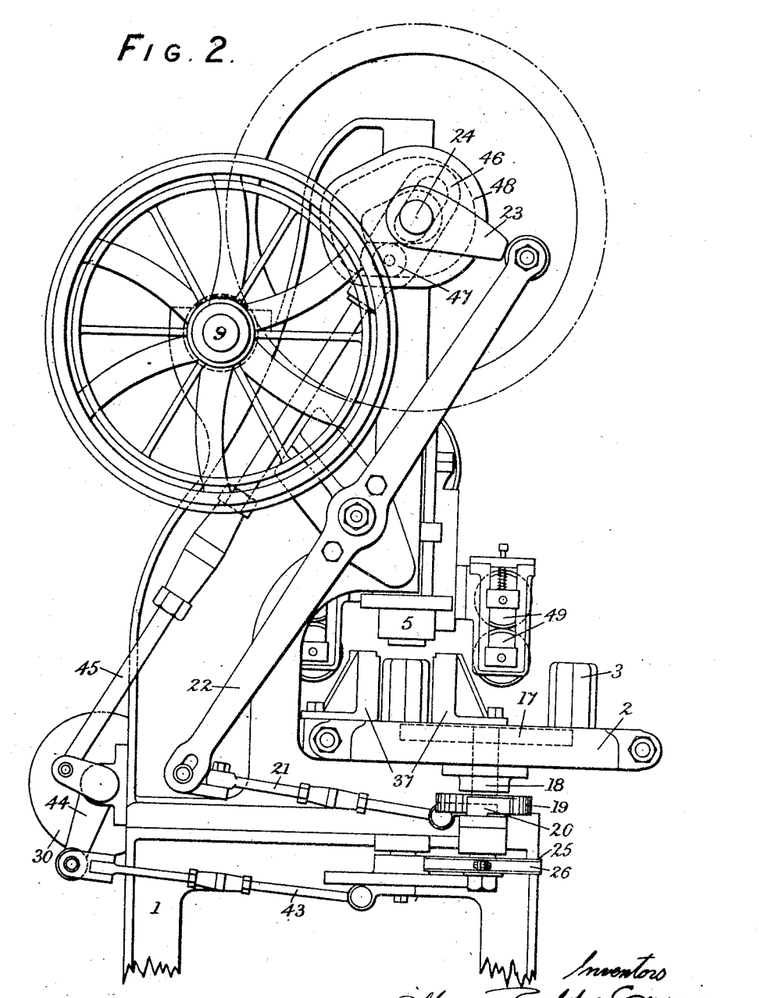
Fig. 2 is an elevation of the right hand side of the machine looking in the direction of the arrow $a$ in Fig. 1.

The die 5 is provided with a central portion 100 which is slidable in the outer portion and acts as a stop to prevent the roll formed by the die 4 from spreading toward the center under the action of the dies 37 and also as a stripper or means for preventing the sticking of the article to the die when the latter rises. The central portion 100 is carried on the rod 101 slidably mounted in the sleeve 102 and is provided with a circumferential groove 103 in which pins 104 in the outer die portion engage. The top of the rod 101 is weighted by means of a bar 105 pivoted to any suitable portion of the machine, its free end traveling in a slot 106 in the slide 6 (Fig. 1). A cross bar 107 is attached to the slide guides (Fig. 1) carrying a set screw 108 with which the end of the bar 105' is adapted to contact when the die rises to its highest position. The operation of this arrangement is as follows:—

Figure 12:
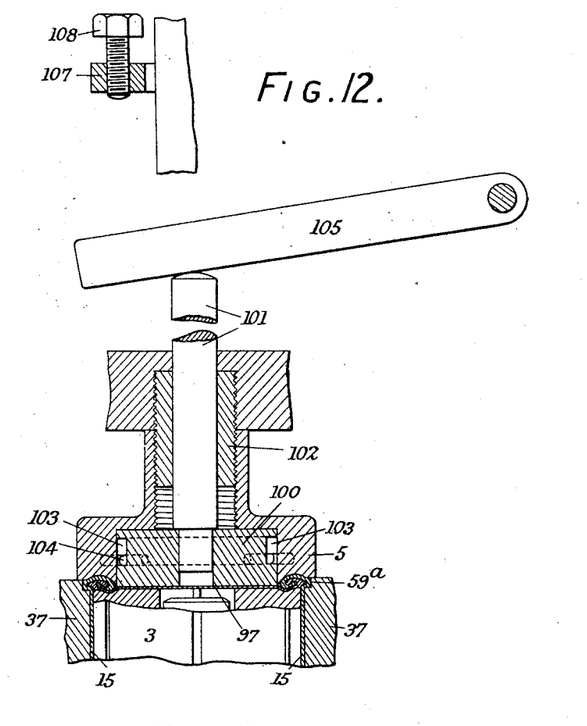
Figure 13:
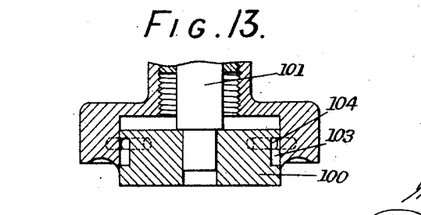
Fig. 13 is a part sectional view of the die shown in Fig. 12, in its raised position showing the action of the stripper mechanism.

In the position shown in Fig. 12 as the die 5 descends upon the article beneath, the central portion 100 is pressed firmly on to the lid and acts to keep the roller portion thereof in its correct position during the operation of the dies 37. When this operation is completed the die rises, the central portion however being held firmly against the box lid by means of the bar 105 pressing on the rod 101, the pins 104 riding in the groove 103. When the pins 104 meet the upper edge of the groove 103 the central portion 100 is lifted together with the outer portion of the die. This method of raising the die minimizes the danger of the article sticking to the die. Should by any chance however the article stick to and be carried up with the die, then the end of the bar 105 will strike the screw 108 at the topmost point of the travel of the die and will cause the central portion 100 to be projected as shown in Fig. 13 thus shaking off the article.

In the machine illustrated means are provided for automatically cutting out and forming the lid blank and introducing same into the box bodies. It is to be understood, however, that the lids may be prepared and fed into the box bodies by hand and the machine illustrated may be in certain cases advantageously used without this automatic lid forming and feeding feature.

In the present machine the cardboard or other material from which the lid blanks are to be formed is fed transversely of the raceway 2 from a stock roll (not shown) between two pairs of horizontal feed rollers 49, 50. The top rollers of each pair are provided with ratchet wheels 51 intermittently operated by pawls 52 connected together by a link 52ª and operated by a connecting rod 53 attached to a crank pin on a disk 54 on the driven shaft 33. The arrangement is such that at each stroke of the pawls 52 sufficient material is fed beneath the cutting and drawing dies to form a lid blank.

Figure 14:
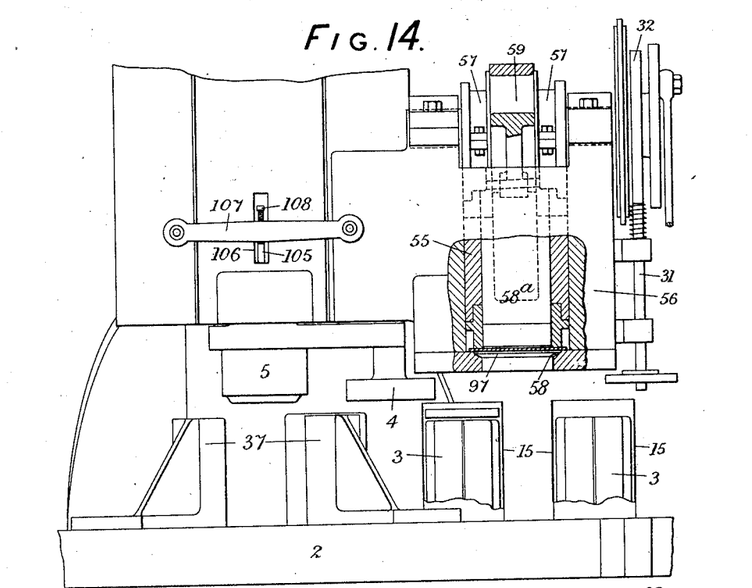
Figs. 14 and 15 are more or less diagrammatic views partly in section and drawn to a larger scale of the die portions of the machine showing the various operations performed in making fitting and securing the box lids or bottoms.
Figure 15:
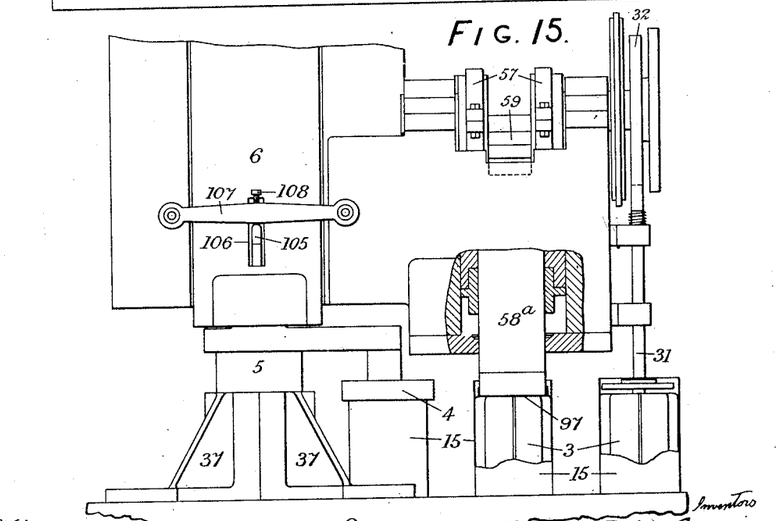

These cutting and drawing dies are shown in Figs. 14 and 15 (herein referred to as a sub-press) and comprise, a tubular cutting die 55 of the requisite size slidably mounted in a block 56 and reciprocated by means of a pair of eccentrics 57 on the shaft 33, and a drawing die 58 in the base of the block 56 which coöperates with the cutting die to cut out a blank 97. When the blank 97 has been cut a plunger 58ª slidably mounted within the cutter 55 and attached to a crank 59 on the shaft 33 is reciprocated and forces the blank through the die 58 and places it in the box body on the mandrel waiting beneath. The combined action of the plunger and drawing die causes the edges of the lid blank to be upturned. The box body with the lid blank in this position (Fig. 10) is now carried on at the next stroke of the press to the die 4.

Referring more particularly to Figs. 10 to 15 the operation of the dies 4 and 5 and of the machine generally is as follows:—

Figure 10:
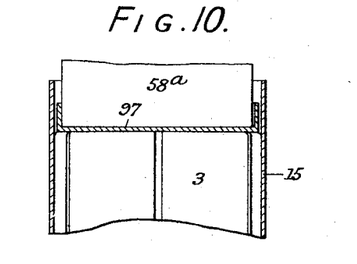
Figs. 10, 11, 12 are part sectional views also drawn to a larger scale showing the operations of the various dies in forming fitting and securing the box lids or bottoms.
Figure 11:
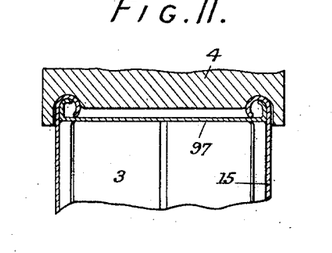

The box bodies such as 15 are slipped over the unexpanded mandrels 3 with a sufficient portion of the body standing up above the top of the mandrel. Considering a single mandrel adjacent the plunger 31:—At the first stroke of the machine this mandrel is carried under the plunger 31 which descends and expands it. The next stroke brings the mandrel under the cutter 55 and plunger 58ª and a dished lid blank 97 is inserted in the box body and pushed home on to the top of the mandrel (Fig. 10). The next stroke brings the mandrel under the die 4 which descends and rolls in the edges of the box body 15 and thus inserts and holds the lid blank 97 to the rolled over portion of the box body as shown in Fig. 11.

Figure 16:
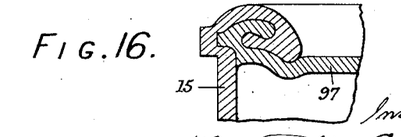
Fig. 16 is a sectional view to an enlarged scale of one form of rolled over joint for securing a blank to a box body, which the machine is adapted to form.

The next stroke brings the mandrel under the die 5 which descends and simultaneously the four expanding and contracting dies 37 close in on and completely encircle the box body and die 5 completing the turning in of the edges of the body and lid blank and forcing and molding the material into recesses 59ª in the dies 37 forming a thickened flange or rim on the box body and making a dovetail lock as can be clearly seen in Fig. 16. Any of these dies may be heated or not as desired. The lid is now secured and the next stroke of the machine retracts the dies 37 and carries the mandrel with the completed lid away from the dies and when desired to a second sub-press for giving extra pressure and for labeling.

At the subsequent stroke the mandrel is contracted as hereinbefore described and the finished article is removed by hand and a fresh body placed on the mandrel. It will be understood that the locking bolt 27 operates also to lock the mandrels at each stroke of the machine. Further, at each stroke of the machine a mandrel is being operated on by each of the dies, as the actions of all the dies are simultaneous. It follows that at every stroke of the machine when running continuously a finished article is produced.

The machine illustrated may be provided with any suitable clutch or starting and stopping gear and with clutch or other mechanism for disconnecting the automatic lid blank making and inserting portion thereof if desired. Although the machine is shown as producing a circular lid or bottom and applying same to a cylindrical body, it will be obvious that any desired shape of lid and body may be employed.

In order to form boxes of different sizes stop rings may be slipped over the mandrels the ends of the box bodies then resting on the rings. Thus boxes of different heights may be formed.

Instead of using an expanding mandrel as herein described a bobbin shaped solid mandrel may be employed. The top of the mandrel being accurately shaped, and it has been found in practice that if the box bodies are slipped over such mandrels they will be sufficiently firmly and accurately held during the operation of the various dies. It will be understood that the machine above described may be provided with dies and mandrels or the like suitable for making boxes or lids from any desired shape of body and blank and with any desired roll over lock joint or other joint with or without a flange.

Further, the machine has been described and illustrated as forming box lids or bottoms from a dished blank. The machine, however, may be utilized for example for securing a plain blank lid or bottom to a box body without the use of a dished portion. In this case for example the dies may be so arranged that a ridge or shoulder is formed at a suitable point on the body upon which the lid or bottom blank rests, the portion of the body above the blank being rolled over on to the blank so that the latter is held in place between the ridge or shoulder and said rolled over portion.

Again the various dies are shown as operating vertically, they may of course be arranged to operate horizontally or in any other desired position, the other parts of the machine being suitably arranged.

Having now particularly described and ascertained the nature of our said invention and in what manner the same is to be performed, we declare that what we claim is:—

1. Means for supporting and successively presenting box blanks to a plurality of mechanisms for operating thereon comprising a plurality of separate and disconnected mandrels, means for intermittently advancing said mandrels, and means for positively holding said mandrels stationary during the operation of said mechanisms, said holding means comprising a shiftable member and means for projecting said member between and into contact with two adjacent mandrels.

2. Means for supporting and successively presenting box blanks to a plurality of mechanisms for operating thereon comprising an endless raceway, a plurality of mandrels provided with bases guided in said raceway so that each base is normally in contact with another base, and means for intermittently advancing said mandrels comprising an intermittently rotated sprocket wheel, the teeth of which are adapted to extend between adjacent mandrels.

3. Means for supporting and successively presenting box blanks to a plurality of mechanisms for operating thereon, comprising an endless raceway, a plurality of mandrels provided with bases guided in said raceway so that each base is normally in contact with another base, and means for intermittently advancing said mandrels comprising an intermittently rotated sprocket wheel, the teeth of which are adapted to extend between adjacent mandrels, and a brake for controlling the rotation of the sprocket wheel.

4. Means for supporting and successively presenting box blanks to a plurality of operative mechanisms comprising an endless raceway, a plurality of mandrels provided with bases guided in said raceway so that each base is normally in contact with another base, means for intermittently advancing said mandrels comprising an intermittently rotated sprocket wheel, the teeth of which are adapted to extend between adjacent mandrels, and means for positively holding the mandrels stationary during the operation of said mechanisms, said holding means comprising a shiftable member and means for projecting said member between and into contact with two adjacent mandrels.

5. Means for supporting and successively presenting box blanks to a plurality of operative mechanisms arranged in a straight line comprising an endless raceway provided with a straight line portion adjacent said mechanisms, a plurality of mandrels provided with bases guided in said raceway so that each base is normally in contact with another base, and means for intermittently advancing said mandrels comprising an intermittently rotated sprocket wheel, the teeth of which are adapted to extend between adjacent mandrels.

6. Means for supporting and successively presenting box blanks to a plurality of mechanisms for operating thereon comprising an expansible mandrel provided with a longitudinally movable wedge shaped member normally permitting the contraction of said mandrel, but adapted when operated to cause the expansion thereof, means for intermittently advancing said mandrel, a reciprocating plunger adapted to operate said wedge shaped member to expand the mandrel prior to the operation of said mechanisms, and means located adjacent the path of travel of the mandrel for retaining said wedge shaped member in operative position during the operation of said mechanisms and for restoring said member after the operation of said mechanisms, to permit the contraction of the mandrel.

7. Means for supporting and successively presenting box blanks to a plurality of mechanisms for operating thereon comprising a raceway and an expansible mandrel provided with a base guided in said raceway and with a longitudinally movable wedge shaped member normally permitting the contraction of said mandrel, but adapted when operated to cause the expansion thereof, means for intermittently advancing said mandrel, a reciprocating plunger adapted to operate said wedge shaped member to expand the mandrel prior to the operation of said mechanisms, and means located adjacent said raceway for retaining said wedge shaped member in operative position during the operation of said mechanisms and for restoring said member after the operation of said mechanisms to permit the contraction of the mandrel.

8. In a device of the character described, the combination of a mandrel adapted to support a box body having a dished lid inserted in the end thereof, means for rolling the edges of the box body over the edges of the lid, and a reciprocating die adapted to coöperate with said mandrel to mold together the edges of the box body and lid, said die being provided with a shiftable central portion adapted to hold the rolled over edges in position during the operation of the die and to strip the box from the die after the completion of such operation.

9. In a device of the character described, the combination of a mandrel adapted to support a box body having a dished lid inserted in the end thereof, means for rolling the edges of the box body over the edges of the lid, a reciprocating die adapted to coöperate with said mandrel to mold together the edges of the box body and lid, said die being provided with a shiftable central portion adapted to hold the rolled over edges in position during the operation of the die and to strip the box from the die after the completion of such operation, and means to positively move said shiftable member relatively to the reciprocating die to insure such stripping action.

10. In a device of the character described, the combination of a mandrel adapted to support a box body, means for upturning the edges of a lid and inserting it into the end of the box body, a reciprocating die adapted to roll the edges of the box body over the edges of the lid, a second reciprocating die adapted to coöperate with the mandrel to mold together the edges of the box body, and means for advancing the mandrel to successively present the box body and applied lid to said reciprocating dies.

11. In a device of the kind described, the combination of a mandrel adapted to support a box body, means for upturning the edges of the lid and inserting it in the end of the box body, a reciprocating die adapted to roll the edges of the box body over the edges of the lid, a second reciprocating die adapted to coöperate with the mandrel to mold together the edges of the box body and lid, and means to advance said mandrel to successively present said box body and applied lid to said reciprocating dies, said second die being provided with a shiftable central portion adapted to strip the box from the die after the molding operation.

12. In a device of the kind described, the combination of a mandrel adapted to support a box body, means for upturning the edges of the lid and inserting it in the end of the box body, a reciprocating die adapted to roll the edges of the box body over the edges of the lid, a second reciprocating die adapted to coöperate with the mandrel to mold together the edges of the box body and lid, means to advance said mandrel to successively present said box body and applied lid to said reciprocating dies, said second die being provided with a shiftable central portion adapted to strip the box from the die after the molding operation, and means to positively move said member to insure said stripping action.

13. In a device of the character described, the combination of a mandrel adapted to support the box body having a dished lid inserted in the end thereof, shiftable die members adapted to surround said mandrel and box body, means for shifting said die members to press the box body against the mandrel, and a reciprocating die adapted to coöperate with said mandrel and die members to mold together the edges of the box body and lid.

14. In a device of the character described, the combination of a mandrel adapted to support the box body having a dished lid inserted in the end thereof, shiftable die members adapted to surround said mandrel and box body, means for shifting said die members to press the box body against the mandrel, and a reciprocating die adapted to coöperate with said mandrel and die members to mold together the edges of the box body and lid, said shiftable die members being provided with a peripheral recess whereby a flange is formed on the exterior of the box during the molding operation.

15. In a device of the character described, the combination of a mandrel adapted to support a box body having a dished lid inserted in the end thereof, shiftable die members adapted to surround said mandrel and box body, means for shifting said die members to press the box body against the mandrel, and a reciprocating die adapted to coöperate with said mandrel and die members to mold together the edges of the box body and lid, said reciprocating die being provided with a shiftable central portion adapted to hold the rolled over edges in position during the operation of the shiftable die members.

16. In a device of the character described, a combination of a mandrel adapted to support a box body having a dished lid inserted in the end thereof, shiftable die members adapted to surround said mandrel and box body, means for shifting said die members to press the box body against the mandrel, a reciprocating die adapted to coöperate with said mandrel and die members to mold together the edges of the box body and lid, said reciprocating die being provided with a shiftable central portion adapted to hold the rolled over edges in position during the operation of the shiftable die members and to strip the box from the reciprocating die after the molding operation, and means to positively move said shiftable portion relatively to the reciprocating die to insure such stripping action.

In testimony whereof we affix our signatures in presence of two witnesses.

WILLIAM RIGHTER COMINGS.
EDWARD JOHN HALL.

Witnesses:
O. J. WORTH,
A. NUTTING.